(12) United States Patent
De Aquino et al.

(10) Patent No.: US 8,096,589 B2
(45) Date of Patent: Jan. 17, 2012

(54) HIGH-RESISTANCE END FITTING FOR A FLEXIBLE TUBULAR PIPE

(75) Inventors: Roberto Jourdan De Aquino, Rio de Janeiro (BR); Jean-François Langui, Vila Velha (BR); Jucimar Coelho Moza, Rio de Janeiro (BR); Gaspar Cunha Xavier, Rio de Janeiro (BR)

(73) Assignee: Technip France (FR)

( * ) Notice: Subject to any disclaimer, the term of this patent is extended or adjusted under 35 U.S.C. 154(b) by 266 days.

(21) Appl. No.: 12/443,203

(22) PCT Filed: Sep. 13, 2007

(86) PCT No.: PCT/FR2007/001480
§ 371 (c)(1),
(2), (4) Date: May 6, 2009

(87) PCT Pub. No.: WO2008/037867
PCT Pub. Date: Apr. 3, 2008

(65) Prior Publication Data
US 2010/0025985 A1   Feb. 4, 2010

(30) Foreign Application Priority Data
Sep. 29, 2006  (FR) .................................... 06 08557

(51) Int. Cl.
  *F16L 33/00* (2006.01)
(52) U.S. Cl. .................. 285/290.2; 285/222.4; 29/527.3
(58) Field of Classification Search ............... 285/290.1, 285/290.2, 290.3, 290.4, 222.5, 222.4; 29/527.3, 29/527.4
See application file for complete search history.

(56) References Cited

U.S. PATENT DOCUMENTS

| | | | | |
|---|---|---|---|---|
| 2,940,778 | A * | 6/1960 | Kaiser | 285/222.4 |
| 3,318,620 | A * | 5/1967 | Cullen et al. | 285/222.5 |
| 3,770,304 | A * | 11/1973 | Keyser | 285/290.4 |
| 3,936,118 | A * | 2/1976 | Thiery et al. | 285/222.4 |
| 4,123,088 | A   | 10/1978 | Tanaka | |
| 4,234,019 | A * | 11/1980 | Hornor et al. | 285/222.2 |
| 4,895,185 | A * | 1/1990 | Champleboux et al. | 138/109 |
| 6,161,880 | A   | 12/2000 | Peppel | |
| 6,273,142 | B1* | 8/2001 | Braad | 285/222.1 |

(Continued)

FOREIGN PATENT DOCUMENTS

EP   1 206 659   8/2005

(Continued)

OTHER PUBLICATIONS

International Search Report dated Jan. 23, 2008 issued in corresponding International Application No. PCT/FR2007/001480.

*Primary Examiner* — David E Bochna
(74) *Attorney, Agent, or Firm* — Ostrolenk Faber LLP

(57) ABSTRACT

An attachment fitting and a method for connection to a tubular duct comprising at least one ply of armors, the armors having a free end respectively defining an outer surface, the attachment fitting comprising a bushing and a sleeve having an attachment part and a connection part with a reception portion, the sleeve being mounted on the duct by spreading the free ends of the armor perpendicularly to the reception portion, the armors comprising a widening device, the bushing being mounted about the connection part and forming an annular chamber for receiving a flow of a mass-curing material for encapsulating the free ends of the armors. The widening device connected to the free outer surface of the free ends of the armors.

9 Claims, 3 Drawing Sheets

U.S. PATENT DOCUMENTS

| | | | |
|---|---|---|---|
| 6,360,781 B1 * | 3/2002 | Braad | 285/222.1 |
| 6,412,825 B1 | 7/2002 | Langkjaer | |
| 6,592,153 B1 * | 7/2003 | Belcher | 285/222.3 |
| 6,742,813 B1 * | 6/2004 | Glejbol | 285/222.4 |
| 6,923,477 B2 * | 8/2005 | Buon et al. | 285/222.1 |
| 7,303,213 B2 * | 12/2007 | Rytter | 285/222.5 |

FOREIGN PATENT DOCUMENTS

| | | |
|---|---|---|
| FR | 2816389 | 5/2002 |
| WO | WO 99/19655 A | 4/1999 |
| WO | WO 01/07818 A | 2/2001 |
| WO | WO 2004/051131 A | 6/2004 |

* cited by examiner

HIGH-RESISTANCE END FITTING FOR A FLEXIBLE TUBULAR PIPE

CROSS REFERENCE TO RELATED APPLICATION

The present application is a 35 U.S.C. §§371 national phase conversion of PCT/FR2007/001480, filed Sep. 13, 2007, which claims priority of French Application No. 0608557, filed Sep. 29, 2006, the disclosure of which is incorporated by reference herein. The PCT International Application was published in the French language.

BACKGROUND OF THE INVENTION

The present invention relates to an end fitting for a flexible tubular pipe with enhanced resistance to being torn out of the pipe.

Flexible tubular pipes, and particularly those for transporting hydrocarbons in a marine environment, comprise, from inside to outside, on the one hand an internal structure consisting of several concentric layers designed to provide in particular the seal and the resistance to radial forces, and on the other hand at least one sheet of tensile armor layers wound with a long pitch making it possible to absorb the tensile forces which are applied to the pipe itself. In the present application, "wound with a long pitch" means any helical winding at a helix angle of less than 60°. Typically, the helix angle of the tensile armor layer sheets is between 25° and 55°.

Such flexible pipes are described in standard documents API 17J and API RP 17B published by the American Petroleum Institute.

Underwater flexible tubular pipes installed at a great depth, in practice at more than 1000 meters, must withstand very considerable stresses. This is particularly the case for riser pipes connecting the sea bed to a production unit situated on the surface, for example to a floating structure. Specifically, because of the great length of the riser, the stress applied to the upper portion by the weight of the pipe may reach several hundreds of tons. That is why the sheets of tensile armor layers of such pipes are usually made of steel with high mechanical characteristics. This makes it possible to increase the tensile resistance of the pipe while limiting its weight.

The steel wires used to manufacture such sheets of tensile armor layers are usually obtained by cold drawing and/or by cold rolling. Specifically, plastic deformation carried out at low temperature during these operations makes it possible not only to precisely form the wire to the desired geometry, but also to greatly increase its tensile yield strength and its ultimate tensile strength. These methods make it possible to manufacture at an advantageous cost carbon steel wires that have an ultimate tensile strength of more than 1400 MPa. These wires however have the disadvantage of not being very ductile and sensitive to temperature which causes difficulties that will be explained below.

Such wires are used for the manufacture of tensile armor layer sheets for the flexible tubular pipes that have to be installed at great depth.

An end fitting is connected to each end of each flexible tubular pipe. Naturally, the tensile forces that are applied to the pipe are also transferred to the end fitting. In the aforementioned case of the upper end fitting of a flexible riser, the tension transmitted to the fitting may reach a very high level. The device for connecting the tensile armor layer sheets to the end fitting must therefore have great resistance to being torn out. In addition, because of the swell, the floating structure to which the flexible riser is connected may oscillate vertically, which has the effect of varying the tension transmitted by the upper end fitting and therefore of generating a fatigue phenomenon. Such a dynamic loading may lead, in certain extreme circumstances, to the pipe being torn out of the end fitting.

To alleviate this, the tensile armor layers must be solidly anchored into the end fitting. For this, the end fitting usually comprises a sleeve which has a portion for connection to the pipe and at the opposite end, a portion for attachment to the floating structure, the connection portion having a portion for housing the free ends of armor layer. Those skilled in the art call this sleeve the end vault. The connection portion and the pipe to which it is connected are fitted into a ring which covers the housing portion and thereby the ends of the armor layers, forming a sealed annular chamber. Those skilled in the art call this ring the end cap. This sealed annular chamber is then covered with a curable polymer which traps the free ends of the armor layers. This solution is simple to apply, but has the disadvantage of requiring a sealed annular chamber of large dimensions, which increases the size and the cost of the end fitting. Specifically, in this solution, the anchoring mechanism relies only on the one hand on the adhesion between the wires and the cured polymer, and on the other hand on the capstan effect associated with the fact that the wires do not extend in a straight line inside the cured polymer.

Therefore, in order to reduce the size of the end fitting while improving its resistance to being torn out, solutions have been thought up that comprise additional immobilization means. These additional means consist in locally deforming the ends of the armor layer wires and in trapping these deformed zones in the cured polymer of the sealed annular chamber.

Thus, document U.S. Pat. No. 6,412,825 discloses a solution in which these local deformations spiral or twist. Document U.S. Pat. No. 6,161,880 discloses another solution in which these local deformations have the shape of a wave. Also known is a third solution, disclosed notably in FIG. 3 of document FR 2816389, in which these local deformations consist in hooks.

These known solutions however have the disadvantage of being difficult to apply in the case of armor layer wires having high mechanical characteristics. Specifically, such wires have the disadvantage of being not very ductile, so much so that it is difficult to manufacture, at ambient temperature, the local deformations in the twist, wave or hook shape. In addition, the wire may crack at these zones that are greatly deformed when cold, which may have the effect of reducing the tear-out resistance of the end fitting, in particular in the case of fatigue stresses. To prevent this cracking problem, it is possible to locally heat the wires before deforming them. However, this solution has the disadvantage of considerably reducing the mechanical characteristics of the wires and therefore of affecting the tear-out strength of the end fitting. Consequently, irrespective of the solution adopted to create the local deformations, namely cold deformation or hot deformation, there is a considerable decline in the case of wires having high mechanical characteristics, which requires the use of an annular chamber of large dimensions, and therefore significantly increases the size and cost of the end fittings designed for deep sea applications.

Document EP 1 206 659 discloses another solution designed mainly for flexible pipes having tensile armor layers made of composite materials, but also being able to be applied to steel armor layers. For this, axial immobilization holes are made in a portion forming a collar secured to the connection portion and the armor layers threaded into these immobilization holes are fitted with widener elements to locally widen the cross section of the armor layers and thereby prevent them from moving in translation through the collar. The widener elements are inserted like a wedge into an axial slot made in the armor layer.

However, such an installation requires not only a substantial transformation of the end fittings currently used in order to be able to pierce immobilization holes, but also it requires axially splitting the tensile armor layers with precision. These arrangements and these methods of application are both costly in material and time. In addition, this installation requires great precision of installation in order to ensure that the various wires are immobilized with the same stress and that the axial clearances of the various immobilization means are identical for all of the wires. If they are not, the stress is not distributed evenly to all the wires, which generates the risk that certain overloaded wires end up breaking, which then increases the loading of the other wires and may end up causing a cascade breakage and a tearing-out of the end fitting.

A problem which then arises and which the present invention aims to solve is to provide an end fitting for a flexible tubular pipe which is not only capable of being produced at an advantageous cost but also which can better resist being torn out than most of those of the flexible pipes currently forming part of the prior art.

For the purpose of solving this problem, the present invention, according to a first object, proposes an end fitting for a flexible tubular pipe, said flexible tubular pipe comprising at least one sheet of tensile armor layers wound with a long pitch, said end fitting comprising a ring and a sleeve, said sleeve having a portion for connection to said pipe and at the opposite end an attachment portion, said connection portion having a portion for housing the armor layers and said connection portion being capable of being engaged in said ring in order to form an annular chamber about said housing portion, said armor layers of said sheet of tensile armor layers having a free end of armor layer suitable for extending into said annular chamber when said sleeve is mounted onto said pipe, said annular chamber being capable of receiving a pouring of a material suitable for solidifying inside said annular chamber, the free ends of armor layers having respectively anchoring means suitable for being trapped in said solidified material in order to prevent said free ends from moving in translation in said annular chamber; according to the invention, said anchoring means comprise respectively a widener element attached to said free ends of armor layer.

Therefore, one feature of the invention lies in the use of widener elements, attached to the free ends, which make it possible to locally widen the free ends of armor layer. In this way, the anchoring means sunk into the solidified material of the annular chamber are totally prevented from moving in translation since the passageways delimited in the material by the free ends have an insufficient cross section to allow the widener elements to pass through. Consequently, the tensile forces that are applied to the armor layers are notably absorbed by the solidified material and by the sleeve by means of the widener elements. The latter, with the extra thickness of the free ends, are prevented from moving in translation at the entrance of the aforementioned passageways.

In addition, said widener elements are advantageously welded to said free ends of armor layer, so that the tensile forces that are applied to the armor layers and that are transmitted to their free ends are not only absorbed by the forces of adhesion and the capstan effect that are exerted between the cured material and the free ends but also by the widener elements, via their welds. Because specifically, the armor layer which defines a passageway inside the cured material can obviously not slide therein since the local widening prevents the free end of armor layer from engaging in this passageway. Furthermore, however great the tensile forces, they could cause neither the deformation nor the shrinking of the local widening.

Advantageously, said widener elements are made of steel and they are therefore easier to weld, for example by electric arc welding or with any other means as will be explained below.

In addition, according to one particularly advantageous embodiment of the invention, said widener elements and said free ends of armor layer have respectively at least one surface portion of widener element and one surface portion of free end of armor layer which together form a cavity that is open to the outside delimited by a concave surface, for example of the recessed groove type. Said open cavity is filled with a molten solder to weld and secure said surface portions together. Therefore, the solder is confined in this open cavity and it then forms a more cohesive and stronger mass of weld. Preferably, said widener element surface portion and free end of armor layer surface portion extend respectively longitudinally in order to form a longitudinal cavity that is open to the outside and therefore the open cavity is furnished with a bead of weld ensuring better adhesion between the two surface portions. Consequently, the binding force between the free end of armor layer and the widener element is increased.

According to a first variant embodiment of the invention, said widener elements extend longitudinally and they have a cross section that is substantially rectangular and identical to the cross section of said free ends of armor layer. Therefore they can not only be made at an advantageous cost by previously sampling armor layer portions, but also, having the same characteristics, they are capable of being welded together with a bead of weld adhering in an identical manner to both.

Preferably, said widener elements and said free ends of armor layer have respectively lateral edges that are beveled so as to form laterally V-shaped longitudinal cavities, when said widener elements are respectively applied longitudinally to said free ends of armor layer. Therefore, not only does the longitudinal cavity thus formed allow an ideal confinement for the solder in order to form the bead of weld, but also the tensile forces are transmitted longitudinally on the bead of weld. This allows a greater strength of the weld itself. Therefore, it has been discovered that this embodiment of the invention makes it possible to achieve great mechanical strength and to do so despite the decline in the mechanical characteristics of the steel at the weld and its heat-affected zone. Therefore, by limiting the cross section of the longitudinal cavities to a value of less than 20% of the section of the wire, advantageously 15%, and by choosing a length of weld bead of the order of 20 to 30 mm, it is possible to produce an immobilization device having an ultimate tensile strength of more than 90% of the ultimate tensile strength of the armor layer wire. The load not absorbed by this immobilization device may easily be absorbed by the adhesion effect and the capstan effect without it being necessary to significantly increase the size of the annular chamber and the cost of the end fitting.

Advantageously, said lateral edges are beveled so that said widener element surface portion and free end of armor layer surface portion are respectively inclined with respect to one another at an angle of between 70° and 110°, preferably of the order of 90°.

According to a second variant embodiment of the invention, said free ends of armor layer have a circular cross section, while said widener elements extend respectively at least partially around said free ends of armor layer. For example, the widener element is formed of a ring that is heat-shrunk onto the free end of armor layer.

According to a second aspect, the present invention proposes a method for connecting an end fitting and a flexible tubular pipe, said flexible tubular pipe comprising at least one sheet of tensile armor layers wound with a long pitch, said armor layers of said sheet of tensile armor layers having a free end of armor layer, said end fitting comprising a ring and a sleeve, said sleeve having a portion for connection to said pipe and at the opposite end an attachment portion, said connection portion having a portion for housing the armor layers, said connection method being of the type in which said sleeve is mounted at the end of said flexible tubular pipe; anchoring means are formed at the free ends of armor layers; said free ends of armor layer are extended level with said housing portion; said ring is engaged about said connection portion in order to form an annular chamber about said housing portion; a material suitable for solidifying inside said annular chamber is poured in order to trap said anchoring means and prevent said free ends from moving in translation in said annular chamber; according to the invention, a widener element is attached to said free ends of armor layer in order to form said anchoring means.

Other features and advantages of the invention will emerge on reading the description given below of particular embodiments of the invention, given as an indication but not being limiting, with reference to the appended drawings in which:

DESCRIPTION OF PREFERRED EMBODIMENTS

Figure 1:
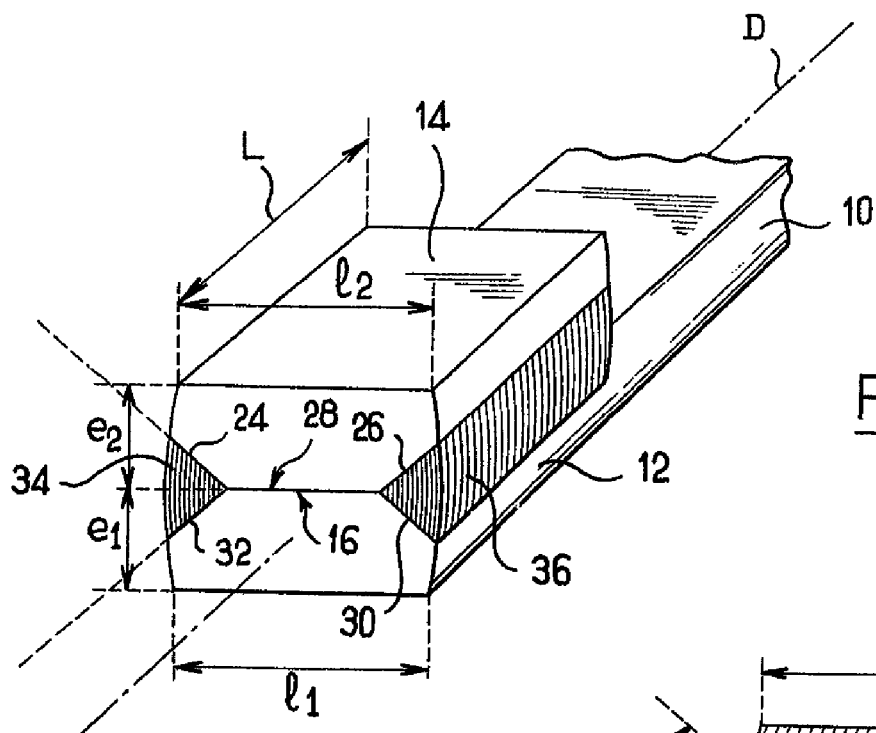
FIG. 1 is a partial schematic view in perspective of a tensile armor layer for an end fitting for a flexible tubular pipe according to a first embodiment of the invention.

FIG. 1 partially illustrates an armor layer 10 made of a flat steel wire. This flat steel wire is of substantially rectangular cross section, with a width 11 of between 5 mm and 30 mm, for example 15 mm, and with a thickness e1 of between 2 mm and 7 mm, for example 5 mm. This armor layer 10 has a free end of armor layer 12 to which a widener element 14 of rectangular section, width 12, thickness e2 and length L is applied in order to form anchoring means.

Figure 2:
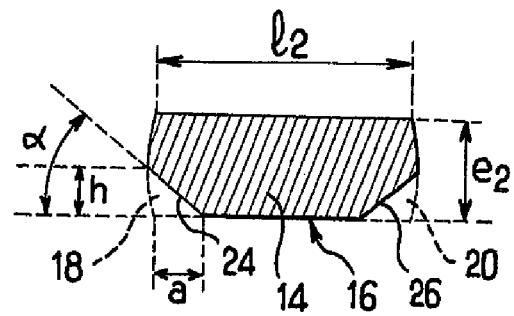
FIG. 2 is a schematic view in cross section of an element illustrated in FIG. 1.

Reference will be made to FIG. 2, illustrating in cross section the widener element 14 in order subsequently to return to FIG. 1 and give details of its method of attachment to the free end of armor layer 12. Advantageously, the widener element 14 is made from a sample of armor layer taken at the end of the armor layer 10, said sample being able to be taken during the operation of installing the end fitting. Therefore, the widener element 14 on the one hand and the free end of armor layer 12 on the other hand have not only the same dimensional characteristics in cross section but also the same physical characteristics, which makes it easier to weld these two parts while enhancing the mechanical strength of the welds. The widener element 14 has a contact surface 16 suitable for being pressed against the outer surface of the free end of armor layer. In addition, two opposite lateral edges 18, 20 which are adjacent to the contact surface 16 are beveled or chamfered in order to form surface portions 24, 26 that are substantially flat, that do not extend longitudinally and that have a slope α relative to the mid plane defined by the contact surface 16 of between 35° and 55°, for example 45°. These surface portions 24, 26 are also called chamfers. The two chamfers 24, 26 advantageously have identical dimensions. They have a height h and a width a which correspond respectively to the maximum thickness and the maximum width of the beveled portion seen in cross section. Note that, when the beveled angle is 45°, the width a is equal to the height h.

Reference will now again be made to FIG. 1, in which the free end of armor layer 12 has been fashioned in a manner symmetrical to the widener element 14 which is applied thereto. Therefore, the free end of armor layer 12 has a bearing surface 28, forming a free outer surface, two lateral edges of which that are adjacent to it have also been beveled in order to form two surface portions 30, 32. These last two surface portions 30, 32 are respectively symmetrical to the other two surface portions 26, 24 of the widener elements 14 relative to the contact surface 16 or to the bearing surface 28 which in this instance are indistinguishable. In this way, when, for example, the aforementioned slope α is 45°, both for the surface portions 26, 24 of the widener element 14 and symmetrically for the surface portions 30, 32 of the free end of armor layer 12, the surface portions are inclined in twos at an angle of 90° and they define a V-shaped open longitudinal cavity. The two open cavities thus formed extend longitudinally over the length L corresponding to the length of the widener element 14.

As illustrated in FIG. 1, the surface portions of widener element 24, 26 and of free end of armor layer 32, 30 are welded together in twos thanks to a solder which extends into the two lateral open cavities forming two opposite beads of weld 34, 36.

Advantageously, these two beads of weld 34, 36 are produced by an electric welding method, of the arc welding type, and preferably in a controlled atmosphere, for example according to the MIG (Metal Inert Gas) or MAG (Metal Active Gas) method.

The connection between the two respective surface portions 24, 32 and 26, 30 is all the stronger because the materials of free end of armor layer 12 and of widener element 14 have the same characteristics. It is the case in this instance and therefore the mechanical strength of the welds is improved.

Therefore, it has been discovered that despite the prejudices of those skilled in the art, this embodiment of the invention makes it possible to produce end fittings having a good mechanical resistance to being torn out. The prejudices were associated with the fact that steels with high mechanical characteristics usually comprising the armor layers are very sensitive to temperature and see their characteristics fall sharply, in practice by more than 50%, when they are subjected to a temperature of more than 1000° C. That is why those skilled in the art usually avoid subjecting these wires to such temperatures and avoid using high-temperature welding methods requiring the melting of the steel.

It seems that the good performance of this embodiment of the invention is mainly associated with the longitudinal orientation of the two beads of weld 34, 36. Specifically, the main mechanical force that these beads of weld must withstand is a shearing in the direction D of the armor layer, a shearing which tends to separate the widener element 14 from the free end of armor layer 12 when the end fitting sustains a stress tending to tear it out. However, orientating the beads of weld parallel with this shearing force makes it possible, with the dimensions being equal, to increase their resistance to this force. This favorable effect partially compensates for the reduction in the mechanical characteristics of the steel in the vicinity of the welds.

Advantageously, the length L of the widener element 14 is greater than or equal to 20 mm. In addition, if the armor layer 10 has a width 11 of more than 20 mm, the length L is preferably greater than or equal to the width 11. Specifically, increasing the length L makes it possible, with the stress being equal, to reduce the shearing stresses in the beads of weld 34, 36 and therefore to increase the resistance of the end fitting from being torn out. On the other hand, the excessive increase in the length L generates the disadvantage of increasing the length of the end fitting. The lengths indicated above offer the best compromise.

In addition, preferably, the chamfers 24, 26, 30, 32 have a slope relative to the mid plane defined by the contact surface 16 of the order of 45°, which makes it possible to facilitate the welding operation while improving the resistance to shearing of the welds.

In addition, advantageously, the height h and the width a of the chamfers 24, 26, 30, 32 are between 45% and 75% of the thickness e1 of the armor layer, and preferably between 55% and 70%. Thus, it has been observed that the resistance against the end fitting being torn out is further improved.

Figure 3:
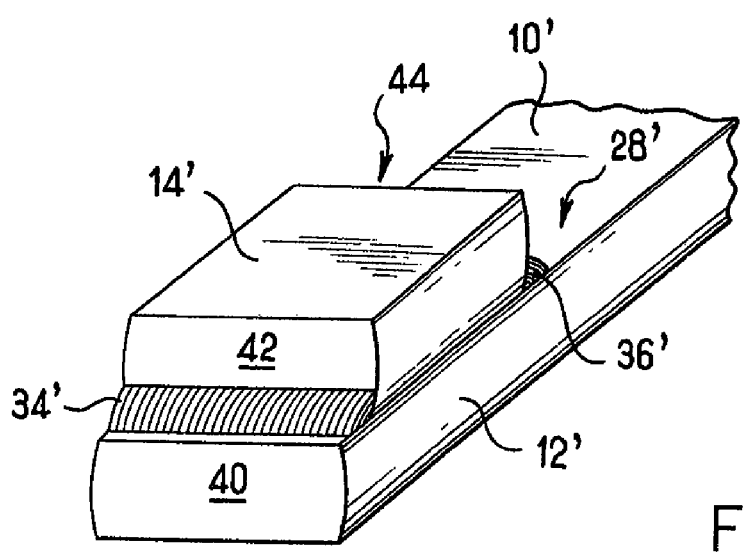
FIG. 3 is a partial schematic view in perspective of a tensile armor layer for an end fitting for a flexible tubular pipe according to a second embodiment of the invention.

Reference will now be made to FIG. 3 illustrating a second embodiment of the invention, in which elements similar to those of the object represented in FIG. 1 bear identical reference numbers with a prime sign "'".

In this way, there is therein again an armor layer 10' having a free end of armor layer 12' which is surmounted by a widener element 14'. The latter has a rectangular cross section identical to that of the free end of armor layer 12', and it is adjusted backward of an end edge 40 of the free end of armor layer 12'. In addition, the widener element 14' has a front cross section 42 and a rear cross section 44 at the back of the drawing, and the free end of armor layer 12' has a bearing surface 28'. The front cross section 42 and rear cross section 44 and the bearing surface 28' then form respectively surface portions also defining two opposite and transverse open cavities, into which extend two opposite beads of weld 34', 36'. These beads of weld are made identically to those described above in FIG. 1. In this way, the widener element 14' is secured to the free end of armor layer 12'.

Figure 4:
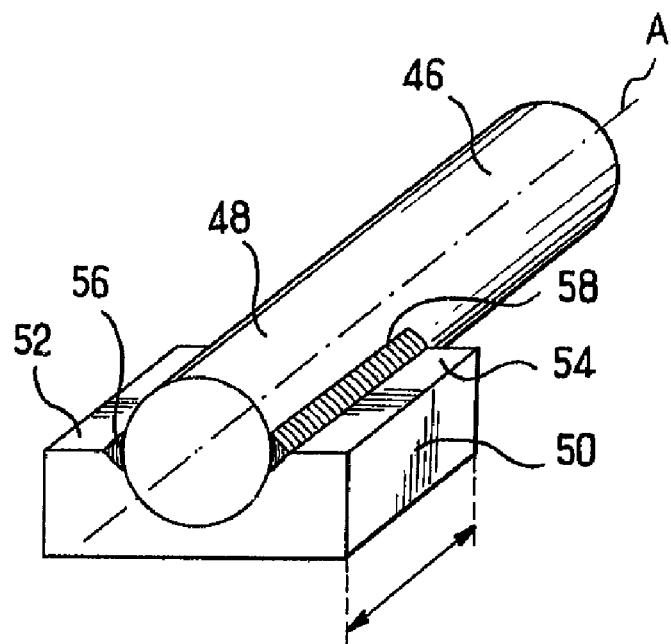
FIG. 4 is a partial schematic view in perspective of a tensile armor layer according to a third embodiment of the invention.

Reference will now be made to FIG. 4, illustrating a third embodiment of the invention. FIG. 4 shows an armor layer 46 made of a round steel wire and a widener element 50 made from a cradle. The armor layer 46 has a free end of armor layer 48 and the cradle 50 which extends longitudinally on the axis A of the free end of armor layer 48 has a semi-cylindrical surface, the directrix of which is a circle and which coincides with the cross section of the free end of armor layer 48. The cradle 50 then has opposite edges 52, 54 on each side of the semi-cylindrical surface.

In this way, the free end of armor layer 48 which defines a free outer surface, resting against the semi-cylindrical surface, defines two double surface portions respectively with the two opposite edges 52, 54, then forming two longitudinal open cavities, into which open cavities extend respectively two opposite longitudinal beads of weld 56, 58.

Figure 5:
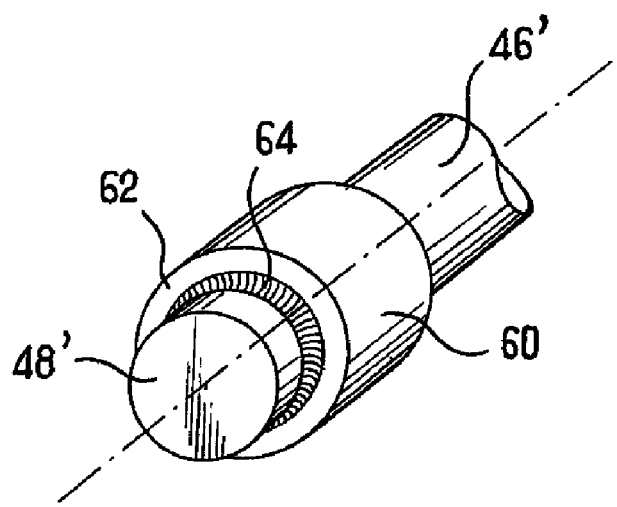
FIG. 5 is a partial schematic view in perspective of a tensile armor layer according to a fourth embodiment of the invention.

Finally, according to a fourth embodiment illustrated in FIG. 5, in which the armor layer 46' is made of a round steel wire similar to that illustrated in FIG. 4, having a free end of armor layer 48', the widener element 60 for its part consists of a crown. The crown 60 has a circular edge 62 and the free end of armor layer 48' engaged in the crown 60 form with the circular edge 62 surface portions defining a circular open cavity. Into this circular open cavity extends a bead of weld 64 which connects all of the surface portions and thereby secures the crown 60 and the free end of armor layer 48' together.

According to an advantageous feature, the free end of armor layer 48' may be mounted by heat-shrinking in the crown 60.

Figure 6:
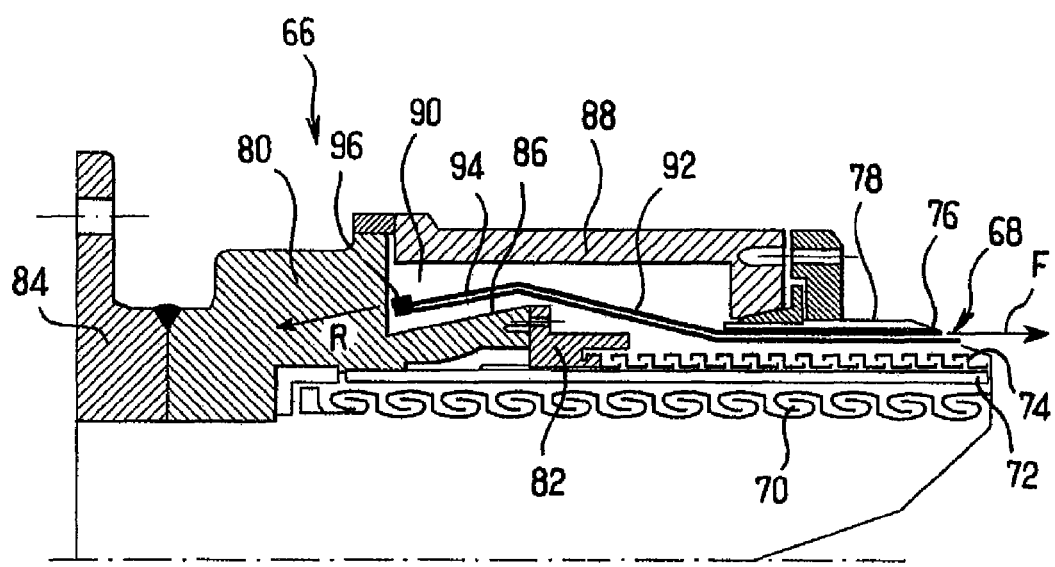
FIG. 6 is a partial schematic view in half axial section of an end fitting for a flexible tubular pipe according to the invention.

Reference will now be made to FIG. 6 showing an end fitting 66 according to the invention wherein the tension armor layers are respectively equipped with widener elements.

FIG. 6 shows partially a flexible tubular pipe 68 having, from inside to outside, an inner frame 70, an inner pressure sheath 72, a layer of pressure armor layers 74, two layers of stress armor layers 76 and an outer sheath 78. The end fitting 66 for its part comprises a sleeve 80 having a portion 82 for connection to the flexible tubular pipe 68, and an attachment portion 84 opposite to the connection portion 82. The connection portion 82 has a portion 86 for housing the layers of stress armor layers 76. In addition, the end fitting 66 comprises a ring 88 that is mounted around the connection portion 82 and that forms a substantially sealed annular chamber 90 about the housing portion 86.

Furthermore, with respect to the flexible tubular pipe 68, the tensile armor layers 76 comprise armor layers 92 the free ends 94 of which are capable of extending into the annular chamber 90 and are fitted with widener elements 96. The widener elements 96 and the free ends of armor layer 94 are respectively linked together according to any one of the aforementioned embodiments with reference to FIGS. 1 to 5.

Therefore, according to another aspect, the present invention relates to a method for connecting the end fitting 66 to the end of the flexible tubular pipe 68. According to said method, first of all the sleeve 80 is mounted at the end of the pipe 68 extending the free ends of armor layer 94 level with the housing portion 86. Then, or previously, the widener elements 96 are fitted to the free ends of armor layer 94 in order to locally widen the cross section thereof. Then the ring 88 is engaged around the connection portion 82 forming the annular chamber 90 about the housing portion 86. The free ends of armor layer then extend into the annular chamber 90. And finally, an epoxy resin is poured which then solidifies in said annular chamber 90 in order to trap the free ends of armor layer 94 therein. Of course, thanks to the adhesive and mechanical characteristics of the epoxy resin after curing, the free ends of armor layer 94 are held in a fixed position in the end fitting 66. Specifically, the epoxy resin forms an indeformable solid in the annular chamber 90.

In this way, the stress forces F which are exerted on the tensile armor layers of the tensile armor layers 76 and which are transferred to the free ends of armor layer 94 are not only absorbed by the capstan effect procured by the curvatures of the free ends of armor layer 94 in the annular chamber 90, but also and above all thanks to the widener elements 96 welded to the surface of the free ends of armor layer 94 which are opposite a resistance R oriented toward the attachment portion 84 and opposed to the stress force F.

The invention claimed is:

1. An arrangement comprising:
   a flexible tubular pipe comprising at least one sheet of tensile armor layers wound with a long pitch;
   an end fitting comprising a ring and a sleeve, the sleeve having one end and a connection portion at the one end for connection to the pipe, the sleeve having an opposite end and an attachment portion at the opposite end, the connection portion having a portion for housing the armor layers, the connection portion being engaged in the ring to form an annular chamber;

the armor layers of the sheet of tensile armor layers having free ends which extend into the annular chamber when the sleeve is mounted onto the pipe, the annular chamber being configured and operable to receive a pouring of a material which solidifies inside the annular chamber;

the free ends of the armor layers have respective anchors thereon configured and operable for being trapped in the solidified material in the annular chamber, wherein the anchors are operable to prevent the free ends of the armor layers from moving in translation in the annular chamber; each of the anchors comprising a widener element attached by welding to the free end of the armor layer.

2. The arrangement as claimed in claim 1, wherein the widener elements are made of steel.

3. The arrangement as claimed in claim 2, wherein the widener elements and the free ends of the armor layer have respectively at least one surface portion of the widener element and one surface portion of the free end of armor layer which oppose one another and are respectively so shaped as to together form an open cavity; and the solidified material comprising a solder filling the open cavity to secure the surface portions against relative movement.

4. The arrangement as claimed in claim 3, wherein the widener element surface portion and the free end of armor layer surface portion respectively extend longitudinally and form a longitudinally extending open cavity.

5. The arrangement as claimed in claim 1, wherein each widener element extends longitudinally and has a cross section that is substantially rectangular; the free ends of the respective armor layer have an identical cross section.

6. The arrangement as claimed in claim 5, wherein the widener elements and the free ends of the armor layer have respective lateral edges that are beveled so as to cooperate to form laterally V-shaped longitudinal open cavities, when the widener elements are respectively applied longitudinally to the free ends of the armor layer.

7. The arrangement as claimed in claim 6, wherein the lateral edges are beveled so that the widener element surface portion and the free end of armor layer surface portion are respectively inclined with respect to one another at an angle of between 70° and 110°.

8. The arrangement as claimed in claim 1, wherein each free end of the armor layer has a circular cross section, and
the respective widener element extends respectively at least partially around the free end of the armor layers.

9. A method for connecting an end fitting and a flexible tubular pipe, wherein the flexible tubular pipe comprises at least one sheet of tensile armor layers wound with a long pitch, the armor layers of the sheet of tensile armor layers having a free end of armor layer, the end fitting comprising a ring and a sleeve, the sleeve having one end and a connection portion at the one end for connection to the pipe, the sleeve having an opposite end and an attachment portion at the opposite end, the connection portion having a portion for housing the armor layers;

the connection method comprising:

mounting the sleeve at the end of the flexible tubular pipe;

forming an anchor at the free ends of each armor layer by attaching by welding a widener element to the free end of the armor layer in order to form the anchor;

extending the free ends of the armor layer level with the housing portion;

engaging the ring about the connection portion in order to form an annular chamber;

pouring a material suitable for solidifying inside the annular chamber to trap the anchor and prevent the free ends of the armor layer from moving in translation in the annular chamber.

\* \* \* \* \*